United States Patent
Dantwala et al.

(10) Patent No.: US 6,847,406 B2
(45) Date of Patent: Jan. 25, 2005

(54) HIGH QUALITY, COST-EFFECTIVE FILM-TO-VIDEO CONVERTER FOR HIGH DEFINITION TELEVISION

(75) Inventors: Nehal R. Dantwala, Peekskill, NY (US); Olukayode Anthony Ojo, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 478 days.

(21) Appl. No.: 09/973,309

(22) Filed: Oct. 9, 2001

(65) Prior Publication Data

US 2002/0093588 A1 Jul. 18, 2002

Related U.S. Application Data

(60) Provisional application No. 60/251,526, filed on Dec. 6, 2000.

(51) Int. Cl.[7] .................................................. H04N 7/01
(52) U.S. Cl. ...................................... 348/452; 348/448
(58) Field of Search ................................. 348/452, 448, 348/458, 459, 700, 581, 441

(56) References Cited

U.S. PATENT DOCUMENTS

| | | | |
|---|---|---|---|
| 5,012,336 A | * | 4/1991 | Gillard .......................... 348/452 |
| 5,929,919 A | | 7/1999 | De Haan et al. ............. 348/452 |
| 5,940,130 A | | 8/1999 | Nilsson et al. ............... 348/416 |
| 5,995,154 A | | 11/1999 | Heimburger ................. 348/448 |

FOREIGN PATENT DOCUMENTS

| | | |
|---|---|---|
| EP | 0514012 A2 | 11/1992 |
| WO | 9819460 A1 | 5/1998 |

OTHER PUBLICATIONS

IC Motion Compensated De–Interlacing, Noise Reduction, and Picture Rate Conversion, by Gerard de Haan et al., International Conference on Consumer Electronics 1999, pp. 212–213.

"Robust Motion–Compensated Video Up–Conversion", by C.A. Ojo and Gerard de Haaan, IEEE Tr. on Consumer Electronics, vol. 43, No. 4, pp. 1045–1056 (Nov. 1997).

* cited by examiner

*Primary Examiner*—Victor R. Kostak

(57) ABSTRACT

High definition video signals are pre-filtered and down-sampled by a video converter system to standard definition picture sizes. Standard definition motion estimators employed for field rate up-conversion are then utilized to estimate motion vectors for the standard definition pictures. The resulting motion vectors are scaled and post-processed for motion smoothness for use in motion compensated up-conversion of the field rate for the high definition pictures. The associated memory size and bandwidth requirements and overall cost render consumer electronics implementations for motion compensated field rate up-conversion of film material to high definition video commercially viable while preserving picture quality.

17 Claims, 2 Drawing Sheets

HIGH QUALITY, COST-EFFECTIVE FILM-TO-VIDEO CONVERTER FOR HIGH DEFINITION TELEVISION

REFERENCE TO PROVISIONAL APPLICATION

This patent application refers to and claims the priority and benefit of Provisional Patent Application Ser. No. 60/251,526 filed Dec. 6, 2000.

TECHNICAL FIELD OF THE INVENTION

The present invention is directed, in general, to video signal conversion and, more specifically, to motion compensated field rate up-conversion of film material for high definition display.

BACKGROUND OF THE INVENTION

With the advent of broadcasting in accordance with Advanced Television Systems Committee (ATSC) digital television (DTV) standards, particularly high definition television (HDTV), the need for displaying film material on high definition television receivers arises. The field rate—the number of full-field images or frames per second, expressed in Hertz (Hz)—for high definition television is generally at least 50–60 Hz and up to 100–120 Hz. However, for historical electro-mechanical reasons, motion picture cameras employed in creating film material have conventionally operated at a capture rate of 24 frames per second. While modern motion picture cameras have been improved, much film exists which was recorded at that previous standard capture rate. Moreover, film captured at 24 Hz provides, when transferred to high definition resolution, comparable quality to high definition cameras, eliminating any incentive for film production companies to discontinue use of traditional cameras in favor of purchasing high definition cameras.

Conversion of film material to higher display field rates is generally performed by simple field repetition, utilizing known 3:2 pull-down or 2:2 pull-down techniques. However, such field rate up-conversion by simple field repetition results in each movement or motion phase (i.e., frame) being displayed multiple times, with moving objects appearing slightly displaced from their expected space-time position in the repeated motion phases. This results in motion blurring for slow object movement and motion jerkiness for fast object movement.

To improve the motion portrayal of up-converted film material, the number of motion phases must be increased. Motion-compensated up-conversion techniques have been developed for this general purpose in up-converting film material to standard definition (SD) television. See, for example, G. de Haan et al, "IC for Motion Compensated De-interlacing, Noise Reduction, and Picture Rate Conversion," International Conference on Consumer Electronics (ICEE) 1999, pp. 212–213 and O. A. Ojo and G. de Haan, "Robust Motion-Compensated Video Up-Conversion," IEEE Tr. On Consumer Electronics, vol. 43 no. 4 pp. 1045–1056 (November 1997).

In addition to higher frame rates, high definition television also employs image sizes which are four to six times greater than either film or standard definition television material. Therefore, for high definition television, the memory size and memory bandwidth requirements of motion estimation are four to six times greater than corresponding requirements for standard definition material due to the higher pixel resolution. These requirements pose a feasibility problem for consumer solutions.

There is, therefore, a need in the art for an improved film-to-video motion compensation technique for up-converting film material to high definition television.

SUMMARY OF THE INVENTION

To address the above-discussed deficiencies of the prior art, it is a primary object of the present invention to provide, for use in a video receiver, a video converter system in which high definition video signals are pre-filtered and down-sampled to standard definition picture sizes. Standard definition motion estimators employed for field rate up-conversion are then utilized to estimate motion vectors for the standard definition pictures. The resulting motion vectors are scaled and post-processed for motion smoothness for use in motion compensated up-conversion of the field rate for the high definition pictures. The associated memory size and bandwidth requirements and overall cost render consumer electronics implementations for motion compensated field rate up-conversion of film material to high definition video commercially viable while preserving picture quality.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device.

Figure 1:
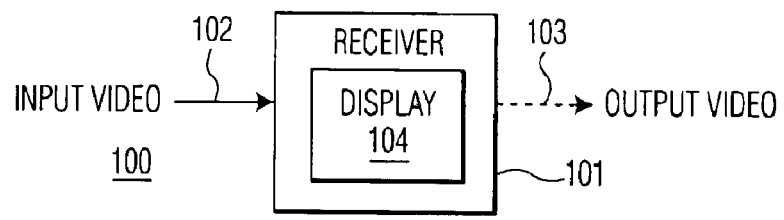
FIG. 1 depicts a video system employing improved motion compensation of film material up-converted for high definition television display according to one embodiment of the present invention.

FIG. 1 depicts a video system employing improved motion compensation of film material up-converted for high definition television display according to one embodiment of the present invention. System 100 includes a video receiver 101, which in the exemplary embodiment is a high definition digital television (HDTV) receiver receiving either terrestrial, satellite or cable broadcasts. Alternatively, however, receiver 101 may be an intermediate transceiver or any other device employed to receive or transceive video signals, as, for example, a transceiver retransmitting video information for reception by a high definition television. In any embodiment, receiver 101 includes a motion compensation mechanism as described in further detail below.

Receiver 101 includes an input 102 for receiving video signals and may optionally include an output 103 for transmitting video signals to another device. In the exemplary embodiment, receiver 101 includes a high definition television display 104 upon which images rendered or otherwise generated according to the improved motion compensation technique of the present invention are displayed.

Those skilled in the art will perceive that FIG. 1 does not explicitly depict all components within the high definition television receiver of the exemplary embodiment. Only so much of the commonly known construction and operation of a high definition television receiver and the components therein as are unique to the present invention and/or required for an understanding of the present invention are shown and described herein.

Figure 2:
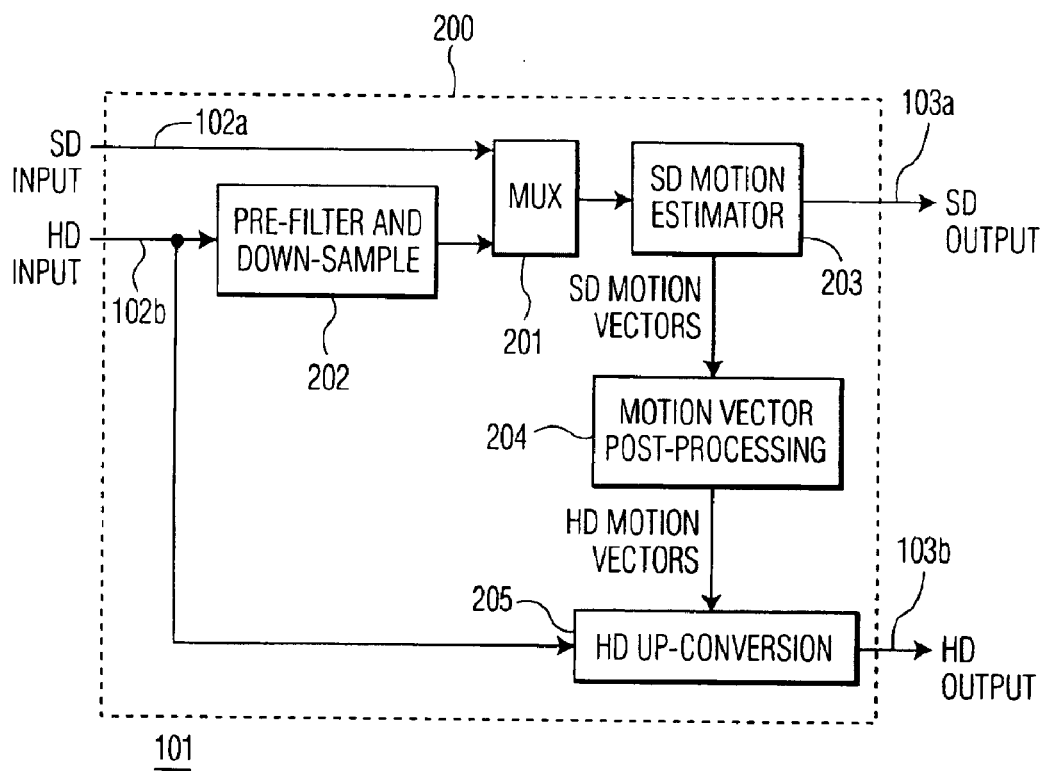
FIG. 2 depicts in greater detail a film to high definition video converter system according to one embodiment of the present invention.

FIG. 2 depicts in greater detail a film to high definition video converter system according to one embodiment of the present invention. Video converter system 200 is implemented within video receiver 101 and includes inputs 102a and 102b for receiving standard definition and high definition video signals, respectively. High definition video signals received on input 102b, while having the increased image resolution required for high definition displays, still requires field rate up-conversion for high definition display. Video converter system 200 also includes standard definition and high definition outputs 103a and 103b, respectively.

In the present invention, rather than perform motion estimation on full-size high definition images, the motion compensation processing is performed on downscaled images. This reduces the complexity and memory requirements while increasing the motion range which may be accommodated utilizing existing motion estimators for standard definition resolution signals.

A multiplexer 201 within video converter system 200 allows either standard definition or high definition video signals to be selected from the inputs 102a-102b for processing, depending upon availability and output needs. Another portion (not shown) of video receiver 101 may perform spatial resolution up-conversion to generate the high definition fields. When high definition video signals are selected, the frames are first converted to standard definition resolution by down-conversion or sub-sampling, performed by pre-filter and down-sample unit 202.

The down-sampling performed by unit 202 may employ a down-sampling factor which varies for different high definition size sequences (e.g., a down-sampling factor of two in both the vertical and horizontal dimensions for a 1440×1080 size picture and a down-sampling factor either of three in both the horizontal and vertical dimensions or of three in the horizontal dimension and two in the vertical dimension for a 1920×1080 size picture). Pre-filtering is performed prior to down-sampling within unit 202 to prevent aliasing artifacts. Down-sampling of the pre-filtered content by a factor of 2 or 3 in both directions may then be performed based upon the following equations:

If (H_size>1440 and H_size<=2160) or (V_size>1152 and V_size<=1728) downsample factor=3 else if (H_size>720) or (V_size>576) downsample factor=2 else downsample factor=1 {no downsampling required; standard definition picture} where H_size is the number of pixels per line and V_size is the number of lines per frame. Pictures larger than 2160×1728 require a downsample factor of 4 or more, not implemented in the exemplary embodiment.

An existing standard definition motion estimator 203, such as Philips Semiconductor IC SAA4992 (which also provides motion compensated de-interlacing, noise reduction, and picture rate conversion for standard definition video signals), is then utilized to generate motion vectors on the down-sampled standard definition size frames, preferably in a motion vector overlay mode where the motion vectors are overlaid on the picture as color data for extraction without additional functionality. Motion compensated de-interlacing, noise reduction, and picture rate conversion may also be performed by motion estimator 203.

The standard definition motion vectors generated by motion estimator 203 are then scaled to high definition velocity by:

$mvxHD[(\text{downsample factor})\times i, (\text{downsample factor})\times j]=(\text{downsample factor})\times mvx(I,j)$ $mvyHD[(\text{downsample factor})\times i, (\text{downsample factor})\times j]=(\text{downsample factor})\times mvy(I,j)$.

It may be seen that both the velocity (magnitude) and the position of the motion vectors is scaled, such that a motion vector application to a block of 2×2 pixels in a standard definition picture will be applicable to a block of (downsample factor×2)×(downsample factor×2) pixels. Thus if the downsample factor is 2, the standard definition motion vectors for blocks of 2×2 pixels are scaled, when employed for high definition pixels, to four times the size of the standard definition pictures such that the same motion vectors relate to 4×4 blocks of pixels.

Scaling results in a loss of accuracy of the motion vectors. For example, motion vectors generated by the SAA4992 integrated circuit motion estimator are 0.25 pixel accurate. After scaling by a factor of 2, the motion vectors are nominally 0.5 pixel accurate, although smoothing during pre-filtering and downsampling causes the true accuracy to be less accurate. The scaled motion vectors are therefore not very reliable, particularly at edges.

The scaled motion vectors are therefore post-processed by unit 204. Post-processing is required to make the scaled motion vectors suitable for high definition resolution. A large quantization factor such as that described above (motion vectors for 2×2 blocks employed for 4×4 blocks) can cause annoying artifacts, particularly at object boundaries within the pictures. Post-processing is thus required for motion smoothness, to refine the standard definition global velocity of the pixels within the block to local velocity.

Following refinement of scaled standard definition motion vectors, high definition motion compensation is performed within up-conversion unit 205. A popular method of up-conversion is averaging, in which, given a frame, a field, and the associated motion vectors, motion-compensated pixels from the frame and the field are averaged. This method is simple and efficient if the motion vectors are accurate, such that motion compensated pixel values for the frame and the field are the same. Otherwise, differences between motion compensated pixel values for the frame and the field will result in blurring or the picture when averaging is performed.

Averaging is useful in situations such as high motion areas since, if good motion compensation cannot be performed, averaging will mask the wrong motion vector within the picture by averaging the erroneous compensation, simultaneously blurring the picture. Since the subject region is fast-moving, the eye will not be able to perceive minute detail in any event. However, such blurring can become unacceptable in slow moving areas. Accordingly, averaging is employed: if the motion compensated pixel from the frame is close to the motion compensated pixel from the field, in which case accuracy of the motion vector may be assumed; or if the motion vectors have high velocity in a given region, with the particular area moving rapidly over consecutive frames.

Figure 3A:
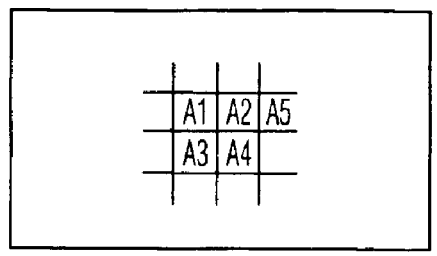
FIG. 3 illustrates motion compensation using the neighboring correlation for a film to high definition video converter system according to one embodiment of the present invention.
Figure 3B:
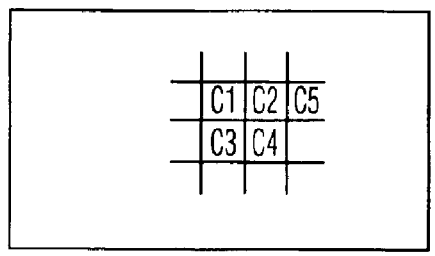
Figure 3C:
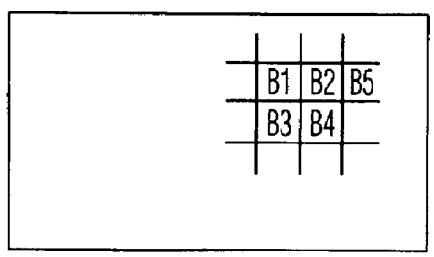

FIG. 3 illustrates motion compensation using the neighboring correlation for a film to high definition video converter system according to one embodiment of the present invention. To avoid blurring of the picture without requiring additional motion estimation, neighboring correlation is employed for motion compensation. Appropriately scaled motion vectors generated based on the standard definition picture, a (previous) high definition frame A at time T, a (next) high definition field B at time T+1, and the causal region of the motion compensated field (pixels A1–A5 and corresponding pixels B1–B5) are all available to perform motion compensation in generating an intervening, motion compensated high definition field C at time T+½.

As previously noted, the scaled motion vectors are globally accurate but not accurate to 0.5 pixel or less; instead, the scaled motion vectors may only be accurate to one or two pixels, which means that edges will be blurred when motion compensation is performed using averaging. The blurring may be avoided, however, by utilizing only one of (a) the frame A motion compensated pixel, and (b) the field B motion compensated pixel rather than averaging the two.

Consider pixel C4 in field C, and the problem of finding an appropriate value for that pixel. Pixel C4 in frame A is the pixel corresponding to the motion compensated pixel C4 and pixel B4 is the motion compensated pixel in field B corresponding to pixel C4. If pixels A4 and B4 are averaged:

$$C4 = \frac{A4 + B4}{2}$$

If A4 and B4 are very different, meaning that the either the motion vector is inaccurate or a region is covered or uncovered by the motion at that pixel, averaging should be avoided and only one of the two pixels A4 and B4 (rather than both) should be employed for motion compensation—that is, C4=A4 or C4=B4. The selection of A4 or B4 is made on the basis of correlation between neighbors of pixel C4 and corresponding neighbors of pixels A4 and B4. If casual neighbors of pixel C4 match the counterpart neighbors of pixel A4, the value of pixel A4 is selected as the value of pixel C4; if not, the neighbors of pixel B4 are compared to the neighbors of pixel B4 and, if matching within a certain limit, the value of pixel B4 is selected as the value of pixel C4:

if (A_correlation<threshold) C4=A4 else if (B_correlation<threshold) C4=B4 where $A\_correlation=|(A1-C1)|+|A2-C2)|+|(A3-C3)|+|A5-C5)|$, and $B\_correlation=|(B3-C1)|+|B2-C2)|+|(B3-C3)|+|B5-C5)|$.

The use of neighboring pixels from field C which are already motion compensated helps verify that the pixel value from the correct frame/field is being utilized. Much of the blurring resulting from averaging is eliminated, giving a sharp motion compensated image. In the case of regions being covered or uncovered, this method of motion compensation allows the better pixel value of the two available to be selected, improving the covered or uncovered regions.

Figure 4:
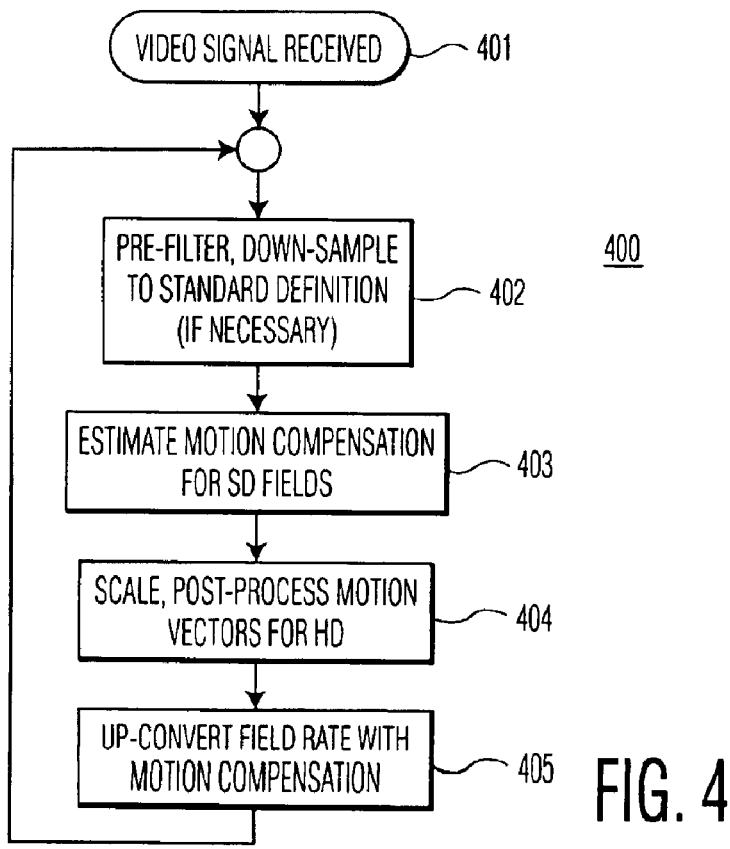
FIG. 4 is a high level flow chart for a process of film to high definition video conversion according to one embodiment of the present invention.

FIG. 4 is a high level flow chart for a process of film to high definition video conversion according to one embodiment of the present invention. The process 400 begins with a video signal being received for field rate up-conversion (step 401). If the received video signal is at a high definition spatial resolution or size, the received field is first pre-filtered and down-sampled to standard definition spatial resolution (step 402).

Motion estimation on the down-sample, standard definition video field in accordance with the known art is then performed (step 403), and the resulting motion vectors are then scaled and post-processed for use in field rate up-conversion of high definition video fields (step 404). The field rate for high definition video fields is then up-converted with motion compensation utilizing the scaled, post-processed motion vectors (step 405). The process continues iteratively until the video signal is lost or otherwise terminated.

The present invention provides cost-effective improvement to motion portrayal of film material up-converted for high definition display. Refinement of motion vectors estimated on down-sampled standard definition fields for use in field rate up-conversion of high definition fields provides better picture quality—in particular, preserving more sharpness—than is obtained using traditional methods.

It is important to note that while the present invention has been described in the context of a fully functional video receiver, those skilled in the art will appreciate that at least portions of the mechanism of the present invention are capable of being distributed in the form of a machine usable medium containing instructions in a variety of forms, and that the present invention applies equally regardless of the particular type of signal bearing medium utilized to actually carry out the distribution. Examples of machine usable mediums include: nonvolatile, hard-coded type mediums such as read only memories (ROMs) or erasable, electrically programmable read only memories (EEPROMs), recordable type mediums such as floppy disks, hard disk drives and compact disc read only memories (CD-ROMs) or digital versatile discs (DVDs), and transmission type mediums such as digital and analog communication links.

Although the present invention has been described in detail, those skilled in the art will understand that various changes, substitutions, variations, enhancements, nuances, gradations, lesser forms, alterations, revisions, improvements and knock-offs of the invention disclosed herein may be made without departing from the spirit and scope of the invention in its broadest form.

What is claimed is:

1. A video converter system for cost-effective motion compensated field rate up-conversion of film material to high definition video comprising:

a down-sampling unit down-sampling received high definition size fields to standard definition size fields a standard definition motion estimator generating motion vectors from the standard definition size fields for motion compensated field rate up-conversion of standard definition size fields;

a scaling unit scaling the motion vectors for use in high definition field rate up-conversion; and a field rate converter employing the scaled motion vectors for motion compensated field rate up-conversion of the high definition size fields.

2. The video converter system as set forth in claim 1 wherein the scaling unit post-processes the scaled motion vectors for motion smoothness within the field-rate up-converted high definition size fields.

3. The video converter system as set forth in claim 1 wherein the field rate converter employs averaging for motion compensation of an intermediate field if a motion compensated pixel value from a previous frame is within a threshold difference from a motion compensated pixel value from a subsequent field.

4. The video converter system as set forth in claim 1 wherein the field rate converter, in performing motion compensation for an intermediate field, selects one of a motion compensated pixel value from a previous frame and a motion compensated pixel value from a subsequent field for a motion compensated pixel value in the intermediate field.

5. The video converter system as set forth in claim 4 wherein the field rate converter selects the motion compensated pixel value from the previous frame for the motion compensated pixel value in the intermediate field if a difference between the motion compensated pixel value from the previous frame and a preliminary motion compensated pixel value in the intermediate field is less than a threshold amount.

6. The video converter system as set forth in claim 5 wherein, if the difference between the motion compensated pixel value from the previous frame and the preliminary motion compensated pixel value in the intermediate field is not less than the threshold amount, the field rate converter selects the motion compensated pixel value from the subsequent field for the motion compensated pixel value in the intermediate field if a difference between the motion compensated pixel value from the subsequent field and the preliminary motion compensated pixel value in the intermediate field is less than the threshold amount.

7. A video receiver comprising:

an input for receiving video signals; and a video converter system for cost-effective motion compensated field rate up-conversion of film material to high definition video comprising:

a down-sampling unit down-sampling received high definition size fields to standard definition size fields;

a standard definition motion estimator generating motion vectors from the standard definition size fields for motion compensated field rate up-conversion of the standard definition size fields;

a scaling unit scaling the motion vectors for use in high definition field rate up-conversion; and a field rate converter employing the scaled motion vectors for motion compensated field rate up-conversion of the high definition size fields.

8. The video receiver as set forth in claim 7 wherein the scaling unit post-processes the scaled motion vectors for motion smoothness within the field-rate up-converted high definition size fields.

9. The video receiver as set forth in claim 7 wherein the field rate converter employs averaging for motion compensation for an intermediate field if a motion compensated pixel value from a previous frame is within a threshold difference from a motion compensated pixel value from a subsequent field.

10. The video receiver as set forth in claim 7 wherein the field rate converter, in performing motion compensation for an intermediate field, selects one of a motion compensated pixel value from a previous frame and a motion compensated pixel value from a subsequent field for a motion compensated pixel value in the intermediate field.

11. The video receiver as set forth in claim 10 wherein the field rate converter selects the motion compensated pixel value from the previous frame for the motion compensated pixel value in the intermediate field if a difference between the motion compensated pixel value from the previous frame and a preliminary motion compensated pixel value in the intermediate field is less than a threshold amount.

12. The video receiver as set forth in claim 11 wherein, if the difference between the motion compensated pixel value from the previous frame and the preliminary motion compensated pixel value in the intermediate field is not less than the threshold amount, the field rate converter selects the motion compensated pixel value from the subsequent field for the motion compensated pixel value in the intermediate field if a difference between the motion compensated pixel value from the subsequent field and the preliminary motion compensated pixel value in the intermediate field is less than the threshold amount.

13. A method of cost-effective motion compensated field rate up-conversion of film material to high definition video comprising:

down-sampling received high definition size fields to standard definition size fields;

generating motion vectors from the standard definition size fields for motion compensated field rate up-conversion of the standard definition size fields;

scaling the motion vectors for use in high definition field rate up-conversion; and employing the scaled motion vectors for motion compensated field rate up-conversion of the high definition size fields.

14. The method as set forth in claim 13 further comprising:

post-processing the scaled motion vectors for motion smoothness within the field-rate up-converted high definition size fields.

15. The method as set forth in claim 13 further comprising:

employing averaging for motion compensation for an intermediate field if a motion compensated pixel value from a previous frame is within a threshold difference from a motion compensated pixel value from a subsequent field.

16. The method as set forth in claim 14 further comprising:

in performing motion compensation for an intermediate field, selecting one of a motion compensated pixel value from a previous frame and a motion compensated pixel value from a subsequent field for a motion compensated pixel value in the intermediate field.

17. The method as set forth in claim 16 further comprising:

selecting the motion compensated pixel value from the previous frame for the motion compensated pixel value in the intermediate field if a difference between the motion compensated pixel value from the previous frame and a preliminary motion compensated pixel value in the intermediate field is less than a threshold amount; and if the difference between the motion compensated pixel value from the previous frame and the preliminary motion compensated pixel value in the intermediate field is not less than the threshold amount, selecting the motion compensated pixel value from the subsequent field for the motion compensated pixel value in the intermediate field if a difference between the motion compensated pixel value from the subsequent field and the preliminary motion compensated pixel value in the intermediate field is less than the threshold amount.

* * * * *